（12） United States Patent
Yagi (10) Patent No.: US 10,696,225 B2
(45) Date of Patent: Jun. 30, 2020

(54) LAMP UNIT

(71) Applicant: KOITO MANUFACTURING CO., LTD., Tokyo (JP)

(72) Inventor: Takayuki Yagi, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 16/206,197

(22) Filed: Nov. 30, 2018

(65) Prior Publication Data

US 2019/0161005 A1    May 30, 2019

(30) Foreign Application Priority Data

Nov. 30, 2017 (JP) ................ 2017-230008

(51) Int. Cl.
| | |
|---|---|
| *F21S 41/36* | (2018.01) |
| *G01J 1/42* | (2006.01) |
| *G01J 1/08* | (2006.01) |
| *G01J 4/04* | (2006.01) |
| *B60Q 11/00* | (2006.01) |
| *F21S 41/675* | (2018.01) |
| *F21S 41/25* | (2018.01) |
| *F21S 41/20* | (2018.01) |
| *F21S 41/365* | (2018.01) |
| *F21S 41/24* | (2018.01) |
| *F21S 41/255* | (2018.01) |

(Continued)

(52) U.S. Cl.
CPC ............ *B60Q 11/005* (2013.01); *F21S 41/24* (2018.01); *F21S 41/25* (2018.01); *F21S 41/255* (2018.01); *F21S 41/285* (2018.01); *F21S 41/322* (2018.01); *F21S 41/36* (2018.01); *F21S 41/365* (2018.01); *F21S 41/675* (2018.01); *F21S 45/00* (2018.01)

(58) Field of Classification Search
CPC ......... G01N 2201/08; G01N 2201/068; G01N 21/1717; G01J 1/08; G01J 1/42; G01J 4/04; G06F 3/0425; F21S 43/26; F21S 43/30; F21S 8/088; F21S 41/16; F21S 41/24; F21S 41/675; F21S 43/251
See application file for complete search history.

(56) References Cited

U.S. PATENT DOCUMENTS

| | | | | |
|---|---|---|---|---|
| 5,938,319 A | * | 8/1999 | Hege | ............ B60Q 1/00 362/459 |
| 2014/0340909 A1 | * | 11/2014 | Yagi | ............ F21S 41/30 362/297 |
| 2016/0161074 A1 | | 6/2016 | Yagi et al. | |

FOREIGN PATENT DOCUMENTS

JP    2016-110760 A    6/2016

* cited by examiner

*Primary Examiner* — David P Porta
*Assistant Examiner* — Fani Boosalis
(74) *Attorney, Agent, or Firm* — Osha Liang LLP (57) ABSTRACT

The light deflection device is configured to switch a first reflection position and a second reflection position in at least some region of the reflection part. The first reflection position is a position at which the light irradiated by the irradiation optical system is to be reflected toward the projection optical system so as to be effectively used as a part of a desired light distribution pattern. The second reflection position is a position at which the light irradiated by the irradiation optical system is to be reflected so as not to be effectively used. The detection unit is arranged at a position at which the light reflected at the second reflection position by the light deflection device can be detected.

5 Claims, 8 Drawing Sheets (51) Int. Cl.
*F21S 41/32* (2018.01)
*F21S 45/00* (2018.01)

LAMP UNIT

CROSS-REFERENCE TO RELATED APPLICATION

This application claims priority from Japanese Patent Application No. 2017-230008 filed on Nov. 30, 2017, the entire contents of which are incorporated herein by reference.

FIELD

The present disclosure relates to a lamp unit.

In the related art, a vehicle illumination device has been known which is configured to selectively reflect light emitted from a light source by a reflection device having a plurality of reflection elements aligned in a matrix shape on a surface thereof and to thereby irradiate the front of a vehicle in a predetermined light distribution pattern (Patent Document 1). The reflection device has the plurality of reflection elements aligned to be tiltable, and can switch positions of the plurality of reflection elements between a first position and a second position. The reflection device is configured to form a light distribution pattern for illuminating a road surface and the like by changing each reflection element between the first position at which a reflection direction of the light from the light source contributes to formation of the light distribution pattern and the second position at which the reflection direction of the light does not contribute to the formation of the light distribution pattern.

Patent Document 1: JP-A-2016-110760

Since the reflection device has the plurality of aligned reflection elements, when malfunction occurs upon switching of the positions of some reflection elements, a region that is not to be originally irradiated is irradiated and a predetermined light distribution pattern cannot be thus formed. For this reason, it is preferable to appropriately detect the malfunction.

SUMMARY

The present disclosure has been made in view of the above situations, and an object thereof is to provide a novel lamp unit capable of detecting malfunction of a light deflection device and the like.

In order to achieve the above object, a lamp unit in accordance with one aspect of the present disclosure includes a projection optical system, a light deflection device arranged at the rear of the projection optical system and configured to selectively reflect incident light toward the projection optical system, an irradiation optical system configured to irradiate light to a reflection part of the light deflection device, and a detection unit configured to detect the light reflected at the light deflection device. The light deflection device is configured to switch, in at least some region of the reflection part, a first reflection position at which the light irradiated by the irradiation optical system is to be reflected toward the projection optical system so as to be effectively used as a part of a desired light distribution pattern and a second reflection position at which the light irradiated by the irradiation optical system is to be reflected so as not to be effectively used, and the detection unit is arranged at a position at which the light reflected at the second reflection position by the light deflection device can be detected.

According to the above aspect, it is possible to detect malfunction of the light deflection device on the basis of the light to be irradiated from the irradiation optical system, the reflection position of the light deflection device and a detection state of the reflected light in the detection unit.

The detection unit may be arranged at a position at which it does not interfere with the light reflected at the first reflection position by the light deflection device. Thereby, the detection unit does not interrupt the effective use of the light irradiated from the irradiation optical system as a part of the desired light distribution pattern.

The detection unit may detect reflected light when the light is irradiated from the irradiation optical system to the reflection part of the light deflection device located at the second reflection position. Thereby, the light irradiated from the irradiation optical system is detected as the reflected light by the detection unit when the light deflection device is normally switched to the second reflection position. In this case, it is estimated that there is no malfunction in the light deflection device. Also, when the light deflection device is not normally switched to the second reflection position and at least a part thereof is kept at the first reflection position, a non-irradiation part (dark part) is detected in at least a part of the reflected light by the detection unit. In this case, it is estimated that there is malfunction in the light deflection device. In the meantime, the detection unit may detect reflected light when the light is irradiated from the irradiation optical system to the reflection part of the light deflection device located at the first reflection position. When the light deflection device is normally switched to the first reflection position, the light irradiated from the irradiation optical system is not detected as the reflected light by the detection unit. In this case, it is estimated that there is no malfunction in the light deflection device. Also, when the light deflection device is not normally switched to the first reflection position and at least a part thereof is kept at the second reflection position, any reflected light is detected by the detection unit. In this case, it is estimated that there is malfunction in the light deflection device.

Another aspect of the present disclosure is also a lamp unit. The lamp unit includes a projection optical system, a light deflection device arranged at the rear of the projection optical system and configured to selectively reflect incident light toward the projection optical system, an irradiation optical system configured to irradiate light to a reflection part of the light deflection device, an inspection light irradiation unit configured to irradiate non-visible light, and a detection unit configured to detect the non-visible light reflected at the light deflection device. The light deflection device is configured to switch, in at least some region of the reflection part, a first reflection position at which the light irradiated by the irradiation optical system is to be reflected toward the projection optical system so as to be effectively used as a part of a desired light distribution pattern and a second reflection position at which the light irradiated by the irradiation optical system is to be reflected so as not to be effectively used, and the detection unit is arranged at a position at which the non-visible light reflected at the first reflection position by the light deflection device can be detected.

According to the above aspect, it is possible to detect malfunction of the light deflection device on the basis of the non-visible light to be irradiated from the inspection light irradiation unit, the reflection position of the light deflection device and a detection state of the reflected non-visible light in the detection unit. Also, it is possible to check whether there is malfunction in the light deflection device at any timing at which the light is not irradiated from the irradiation optical system. For this reason, when checking whether there is malfunction in the light deflection device, it is possible to prevent the light from the irradiation optical system from being leaked to an outside of the unit.

The light deflection device may include a micro mirror array. Each mirror element of the micro mirror array may be configured to switch the first reflection position and the second reflection position about a rotation axis. The rotation axis may extend along a diagonal line of a reflective surface of the mirror element. Thereby, it is possible to form a light distribution pattern having diverse shapes quickly and precisely.

In the meantime, any combination of the above constitutional elements, and a method, a device, a system and the like of the present disclosure are also effective as aspects of the present disclosure.

According to the present disclosure, it is possible to provide the novel lamp unit capable of detecting the malfunction of the light deflection device and the like.

DETAILED DESCRIPTION

Hereinafter, the present disclosure will be described on the basis of preferred embodiments with reference to the drawings. The same or equivalent elements, members and processing shown in the respective drawings are denoted with the same reference numerals, and the overlapping descriptions thereof are appropriately omitted. Also, the embodiments are not to limit the present disclosure and are exemplary, and all features and combinations thereof described in the embodiments are not construed as being essentials to the present disclosure.

First Embodiment

[Lamp Unit]

Figure 1:
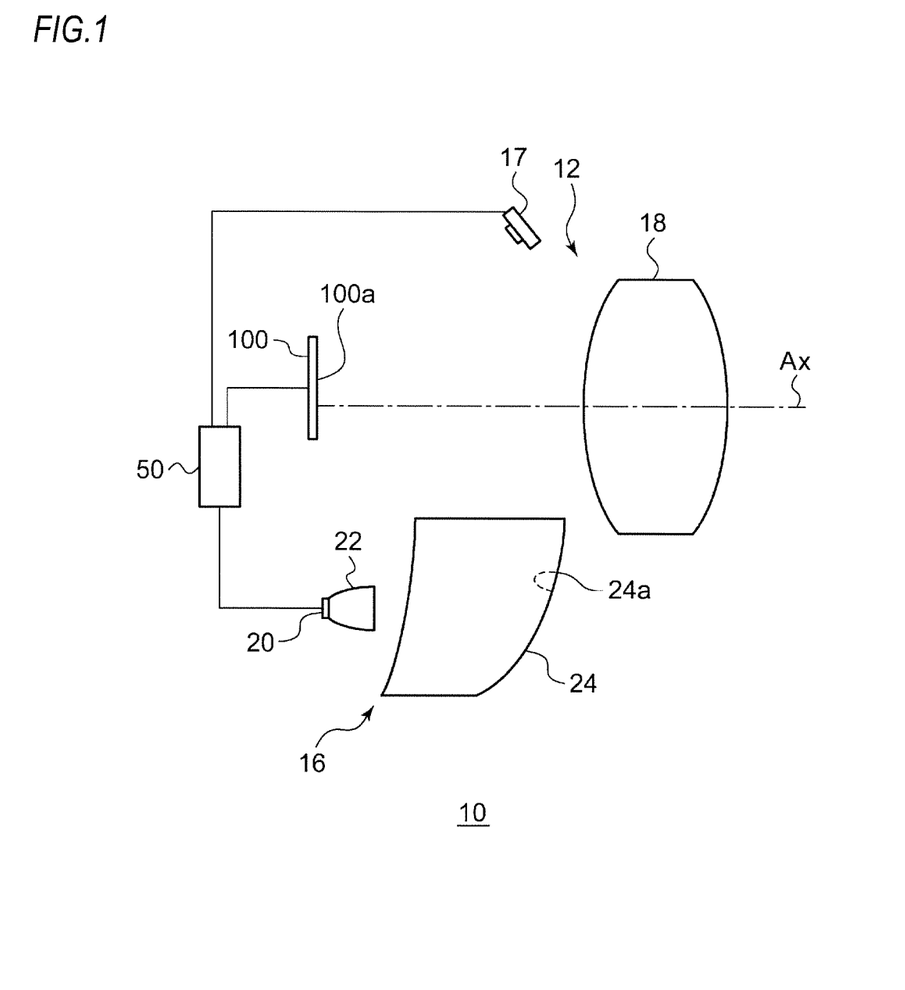
FIG. 1 is a side view pictorially depicting a schematic structure of a lamp unit in accordance with a first embodiment.

FIG. 1 is a side view pictorially depicting a schematic structure of a lamp unit in accordance with a first embodiment. A lamp unit 10 of the first embodiment includes a projection optical system 12, a light deflection device 100 arranged on an optical axis Ax of the projection optical system 12 and configured to selectively reflect incident light toward the projection optical system 12, an irradiation optical system 16 configured to irradiate light to a reflection part 100a of the light deflection device 100, an imaging unit 17 as a detection unit configured to detect light reflected at the light deflection device 100, and a control unit 50. The projection optical system 12 includes a projection lens 18. The irradiation optical system 16 includes a light source 20, a light condensing member 22, and a reflector 24.

The imaging unit 17 is a camera or video having an imaging element and may be any unit capable of converting an optical signal into an electric signal. Also, a light condensing member (a reflection member such as a reflector or a refraction member such as a lens) for condensing light reflected at the light deflection device 100 to a light receiving part of the imaging unit 17 may be arranged between the imaging unit 17 and the light deflection device 100.

The lamp unit 10 of the first embodiment is mainly used for a vehicle lamp (for example, a vehicle headlight), but the use for the lamp unit 10 is not limited thereto. The lamp unit 10 can also be applied to a lamp of a variety of illumination devices and a variety of moving bodies (an airplane, a train vehicle, and the like). Also, the lamp unit 10 shown in FIG. 1 is configured so that the respective components are arranged up and down with the optical axis Ax being interposed therebetween. Thereby, it is possible to reduce a size of the lamp unit in a width direction. In the meantime, the lamp unit 10 may also be configured so that the respective components are rotated by 90° about the optical axis Ax and are thus arranged right and left with the optical axis Ax being interposed therebetween. In this case, it is possible to reduce a size of the lamp unit in a height direction.

As the light source 20, a semiconductor light-emitting device such as an LED (Light emitting diode) device, an LD (Laser diode) device, an EL (Electro luminescence) device and the like, a bulb, an incandescent lamp (halogen lamp), a discharge lamp, and the like can be used. The light condensing member 22 is configured to guide most of the light emitted from the light source 20 to a reflective surface 24a of the reflector 24. For example, a convex lens, a hollow light guide member having a cannon shape, a reflector of which an inner surface is formed as a predetermined reflective surface, or the like is used as the light condensing member 22. More specifically, a compound parabolic concentrator may be exemplified as the light condensing member 22. When it is possible to guide most of the light emitted from the light source 20 to the reflective surface of the reflector 24, the light condensing member may not be used. The light source 20 is mounted to a desired position of a heat sink such as metal, ceramic or the like, for example.

The light deflection device 100 is arranged on the optical axis X at the rear of the projection optical system 12, and is configured to selectively reflect the light emitted from the light source 20 toward the projection optical system 12. The light deflection device 100 includes a plurality of micro mirrors such as MEMS (Micro Electro Mechanical System) and DMD (Digital Mirror Device) aligned in an array (matrix) shape. By controlling angles of reflective surfaces of the plurality of micro mirrors, respectively, it is possible to selectively change a reflection direction of the light emitted from the light source 20. That is, a part of the light emitted from the light source 20 can be reflected toward the projection optical system 12 and the other light can be reflected toward a direction in which it is not effectively used. Here, the direction in which the light is not effectively used may be a direction in which the reflected light less influences (for example, a direction in which the light hardly contributes to formation of a desired light distribution pattern) or a direction facing toward a light absorption member (a light shield member).

The projection optical system 12 of the first embodiment is configured so that a micro mirror array (which will be described later) of the light deflection device 100 is arranged in the vicinity of a focus of the projection lens 18. In the meantime, the projection optical system 12 may have a plurality of optical members such as lenses. Also, the optical member included in the projection optical system is not limited to the lens and may be a reflection member.

In the meantime, the projection optical system 12 of the first embodiment includes the reflector 24 configured to reflect the light emitted from the light source 20 toward the light deflection device 100. The reflector 24 is configured to focus the reflected light to the reflection part 100a of the light deflection device 100. Thereby, the light emitted from the light source 20 can be enabled to be directed toward the reflection part 100a of the light deflection device 100 without waste.

Also, the reflective surface 24a of the reflector 24 has an area greater than the reflection part 100a of the light deflection device 100. Thereby, it is possible to miniaturize the light deflection device 100. Also, the irradiation optical system 16 of the first embodiment includes the light source 20 including a semiconductor light-emitting device, and the compound parabolic light condensing member 22 configured to condense the light emitted from the light source 20. Thereby, the light emitted from the light source 20 can be enabled to be directed toward the reflection part 100a of the light deflection device 100 without waste.

The lamp unit 10 configured as described above can be used for a variable light distribution headlight configured to implement partial lighting/lights-out.

[Light Deflection Device]

Figure 2A:
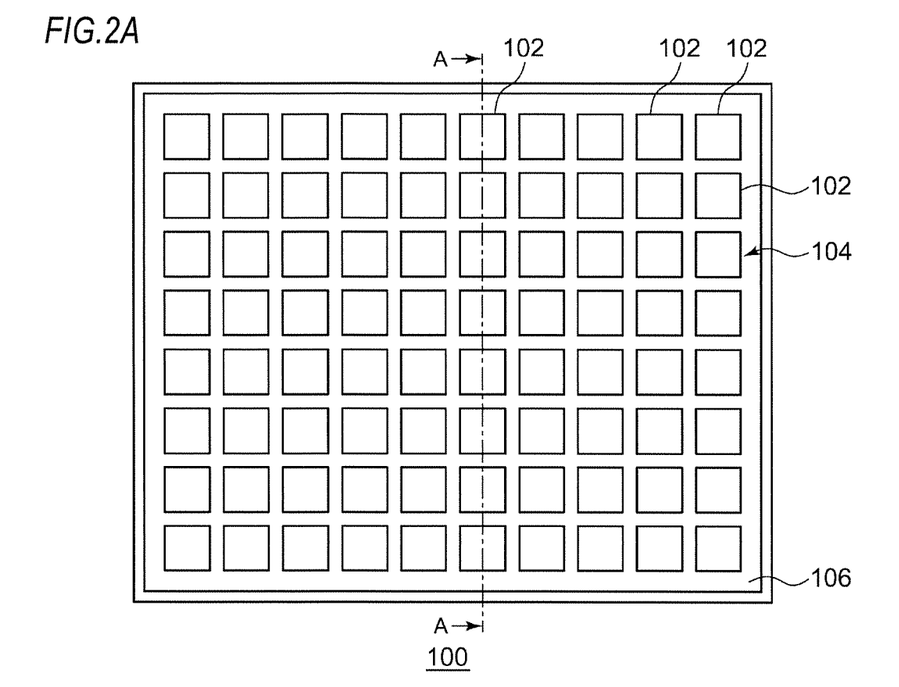
FIG. 2A is a front view depicting a schematic structure of a light deflection device in accordance with a reference example.
Figure 2B:
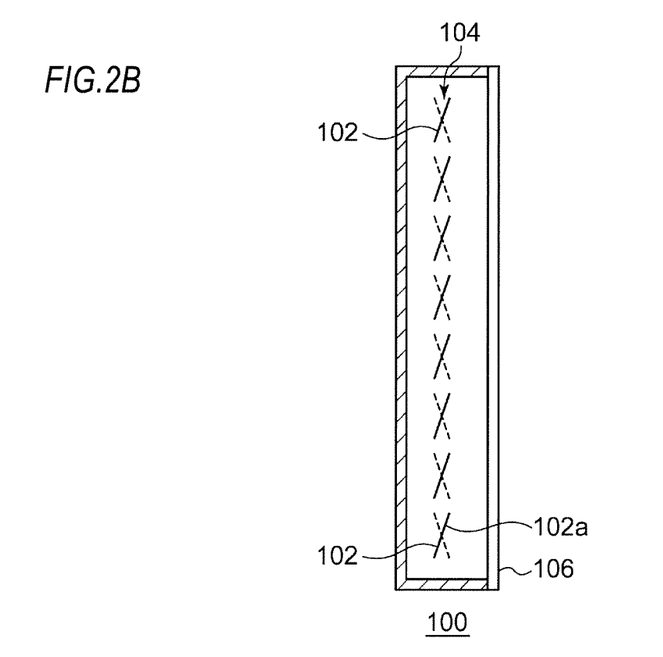
FIG. 2B is a sectional view taken along a line A-A of the light deflection device shown in FIG. 2A.

FIG. 2A is a front view depicting a schematic structure of a light deflection device in accordance with a reference example, and FIG. 2B is a sectional view taken along a line A-A of the light deflection device shown in FIG. 2A.

As shown in FIG. 2A, a light deflection device 100 of the reference example includes a micro mirror array 104 in which a plurality of small mirror elements 102 is aligned in a matrix shape, and a transparent cover member 106 arranged at a front side (a right side of the light deflection device 100 shown in FIG. 2B) of reflective surfaces 102a of the mirror elements 102. The cover member is formed of glass, plastic or the like, for example.

Each mirror element 102 of the micro mirror array 104 is configured to switch a first reflection position P1 (a solid line position shown in FIG. 2B) at which the light emitted from the light source is to be reflected toward the projection optical system so as to be effectively used as a part of a desired light distribution pattern and a second reflection position P2 (a dotted line position shown in FIG. 2B) at which the light emitted from the light source is to be reflected so as not to be effectively used.

Figure 3:
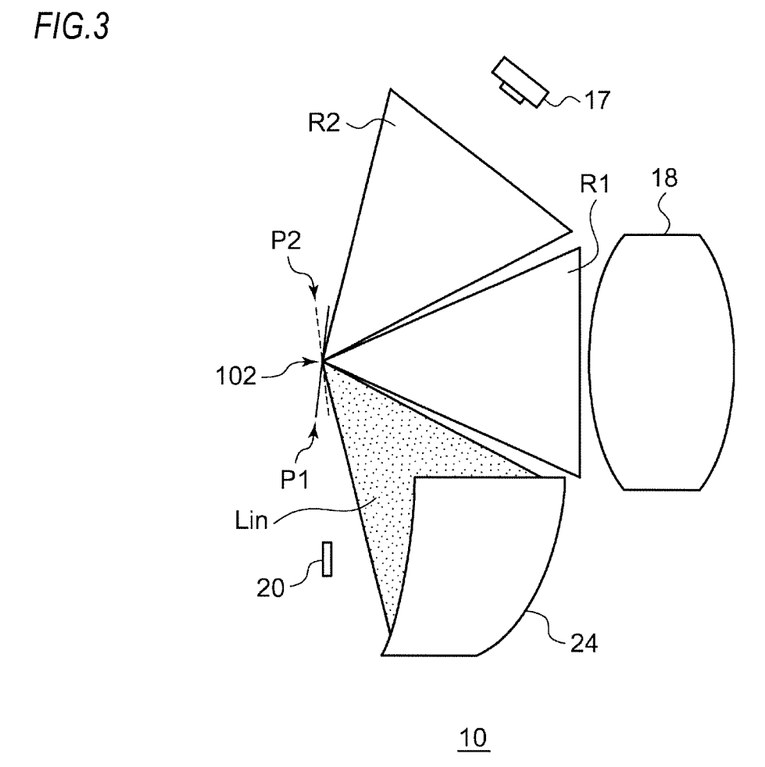
FIG. 3 is an enlarged pictorial view of reflected light when light emitted from a light source is reflected at a first reflection position and a second reflection position by a mirror element.

FIG. 3 is an enlarged pictorial view of reflected light when the light emitted from the light source is reflected at the first reflection position and the second reflection position by the mirror element. In FIG. 3, the micro mirror array is shown by one mirror element so as to simplify the description. Also, the light condensing member 22 shown in FIG. 1 is omitted.

As shown in FIG. 3, since the light emitted from the light source 20 is condensed and reflected by the reflector 24, the incident light Lin is not completely parallel light. That is, when the incident light Lin is incident on the reflective surface 102a of the mirror element 102, an incidence angle thereof is enlarged to some extent. The mirror element 102 is arranged so that when the mirror element 102 reflects the incident light Lin at the first reflection position P1, the reflected light R1 is mainly directed toward the projection lens 18. Also, as shown in FIG. 3, the mirror element 102 is arranged so that when the mirror element 102 reflects the incident light Lin at the second reflection position P2, the reflected light R2 is not directed toward the projection lens 18.

By controlling the reflection position of each mirror element 102 to selectively change the reflection direction of the light emitted from the light source 20, it is possible to obtain a desired projection image or reflection image and a light distribution pattern. That is, the light deflection device 100 of the first embodiment is configured to switch, in at least some mirror elements 102 of the reflection part 100a, the first reflection position P1 at which the light irradiated by the irradiation optical system 16 is to be reflected toward the projection optical system 16 so as to be effectively used as a part of a desired light distribution pattern and the second reflection position P2 at which the light irradiated by the irradiation optical system 16 is to be reflected so as not to be effectively used. The imaging unit 17 is arranged at a position at which the reflected light R2 reflected at the second reflection position P2 by the mirror element 102 can be detected.

Figure 4:
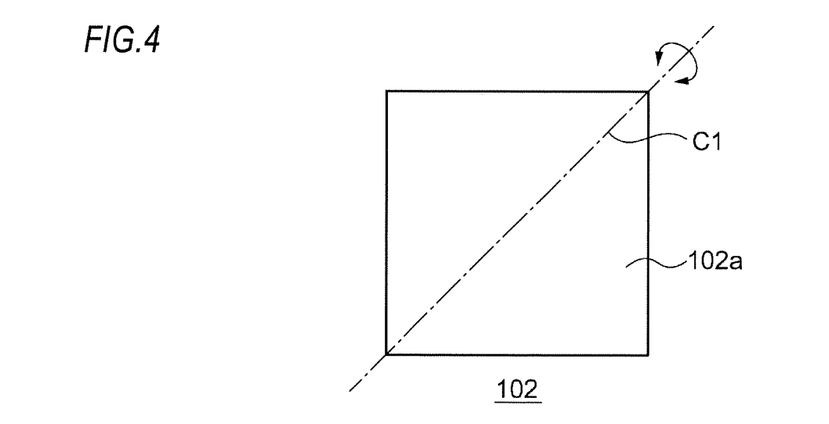
FIG. 4 is a pictorial view for illustrating a rotation axis of the mirror element in accordance with the first embodiment.

FIG. 4 is a pictorial view for illustrating a rotation axis of the mirror element 102 in accordance with the first embodiment. The mirror element 102 has the quadrangular (for example, square, rhombus, rectangle and parallelogram) reflective surface 102a. Each mirror element 102 is configured to switch the first reflection position P1 and the second reflection position P2 about a rotation axis C1 extending along a diagonal line of the quadrangular reflective surface 102a. Thereby, it is possible to form a light distribution pattern having diverse shapes quickly and precisely.

Figure 5:
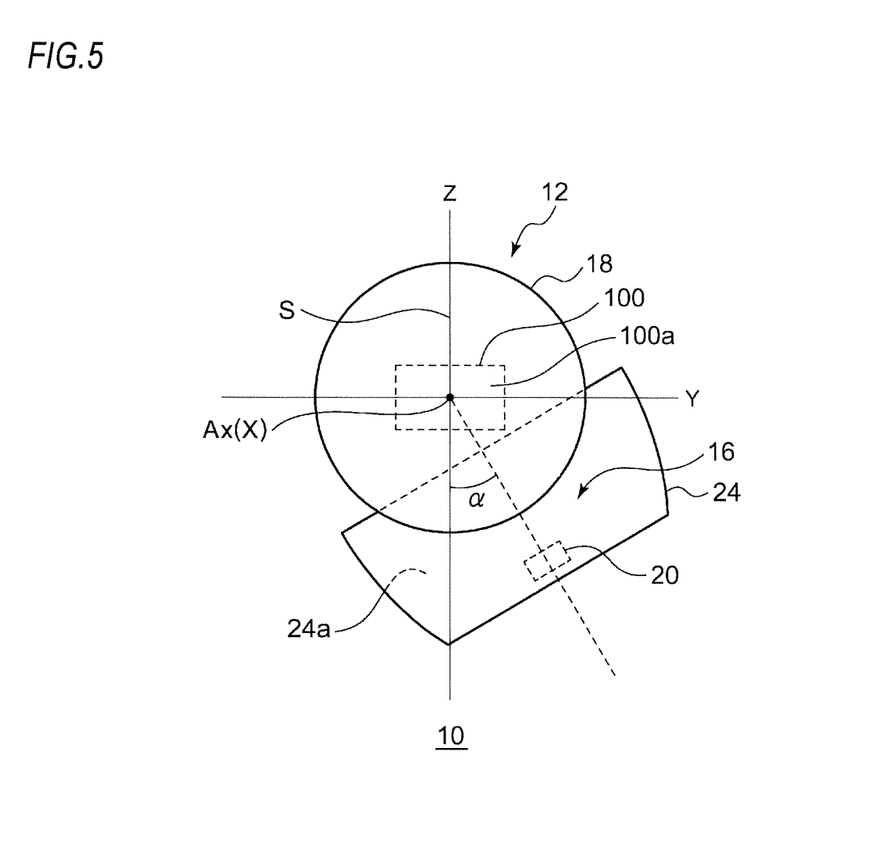
FIG. 5 is a front view depicting the schematic structure of the lamp unit in accordance with the first embodiment.
Figure 6:
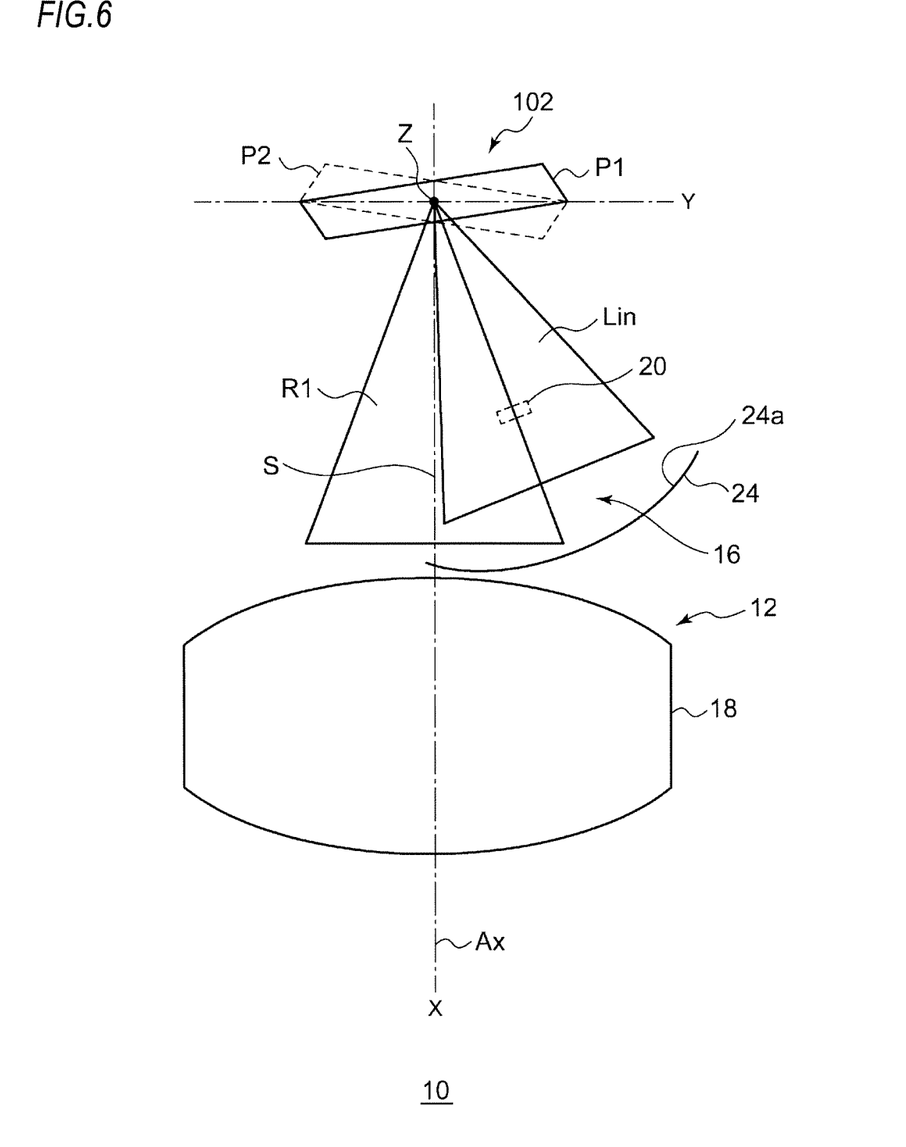
FIG. 6 is an enlarged top view pictorially depicting the reflected light in the lamp unit of FIG. 5.
Figure 7:
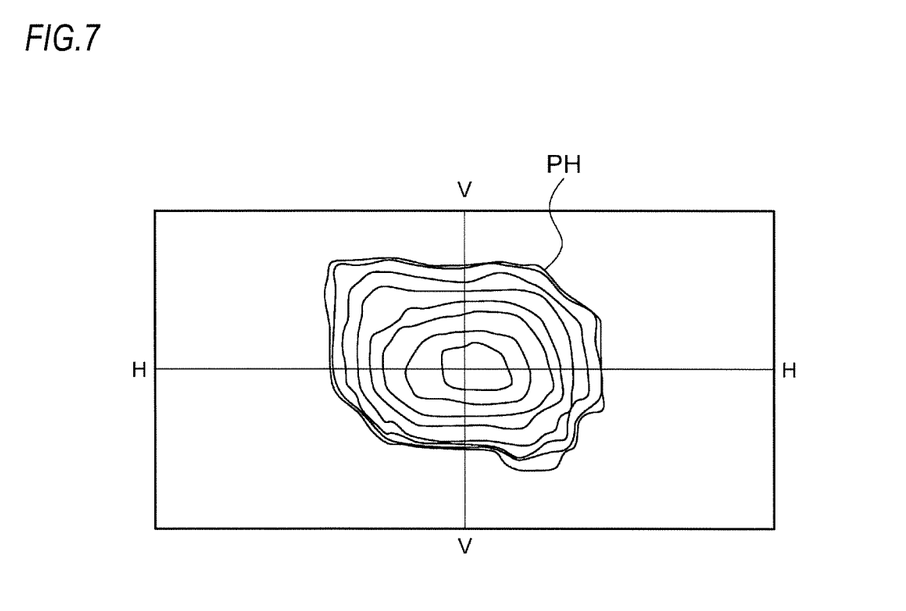
FIG. 7 is a pictorial view depicting an example of an irradiation pattern that is formed by the lamp unit in accordance with the first embodiment.

FIG. 5 is a front view depicting the schematic structure of the lamp unit 10 of the first embodiment. FIG. 6 is an enlarged top view pictorially depicting the reflected light in the lamp unit of FIG. 5. FIG. 7 is a pictorial view depicting an example of an irradiation pattern that is formed by the lamp unit 10 of the first embodiment.

As shown in FIGS. 5 and 6, the irradiation optical system 16 of the first embodiment is arranged to irradiate the mirror element 102 of the reflection part of the light deflection device 100 from a position deviating to the front face-side (a right side of the optical axis Ax shown in FIG. 6) of the first reflection position P1 on the basis of a vertical plane S (XZ plane) including the optical axis Ax of the projection optical system 12.

The irradiation optical system 16 of the lamp unit 10 configured as described above is arranged to irradiate the reflection part 100a of the light deflection device 100 from a position deviating to the front face of the first reflection position P1, rather than the front face of the second reflection position P2. For this reason, an incidence angle and a reflection angle of the light of the irradiation optical system 16 at the first reflection position P1 are smaller than an incidence angle and a reflection angle at the second reflection position P2. As a result, it is possible to compact a layout of the irradiation optical system 16 and the projection optical system 12. Also, since the incidence angle and the reflection angle to the mirror element 102 at the first reflection position P1 are small, the reflected light that is not to be incident on the projection optical system 12 is reduced. That is, it is possible to use the light of the irradiation optical system 16 for the light distribution pattern without waste.

The irradiation optical system 16 is arranged at a place rotated about the optical axis Ax by α° (0<α<45) toward a side close to the front face of the first reflection position P1, based on the vertical plane S including the optical axis Ax of the projection optical system 12. In the meantime, the rotating angle α may be diversely changed in correspondence to a setting of a rotating angle of the mirror element 102 (angle displacements of the first reflection position and the second reflection position about the rotation axis C1, which is a center of rotation) but is preferably 5° or greater and 40° or smaller.

As shown in FIG. 7, the lamp unit 10 configured as described above can implement a substantially rectangular irradiation pattern PH. That is, the entire irradiation optical system 16 is rotated by assuming that a light source image is rotated when it is reflected at the light deflection device 100, so that it is possible to easily implement a desired light distribution pattern. Also, the entire irradiation optical system 16 is rotated with keeping a relative arrangement relation between the light source 20 and the reflector 24, so that when the light source image is reflected on the reflector 24, a reflection image is not changed and reaches the light deflection device 100. Therefore, it is possible to easily perform an optical design. Thereby, while implementing the desired light distribution pattern, it is possible to compact a layout of the entire lamp and to increase an amount of the reflected light to be incident on the projection optical system 12.

Subsequently, function of the imaging unit 17 for detecting malfunction of the light deflection device 100 is described. The lamp unit 10 of the first embodiment can detect malfunction of the light deflection device 100, based on the light to be irradiated from the irradiation optical system 16, the reflection position (the first reflection position or the second reflection position) of the light deflection device 100, and information of a detection state (a dark part or a bright part in an image) of the reflected light in the imaging unit 17. In the below, the malfunction detection method of the light deflection device 100 is specifically described.

As shown in FIG. 3, the imaging unit 17 is arranged at a position at which it does not interfere with the reflected light R1 reflected at the first reflection position P1 by the light deflection device 100. Thereby, the imaging unit 17 does not interrupt the effective use of the light irradiated from the irradiation optical system 16 as a part of the desired light distribution pattern.

Figure 8A:
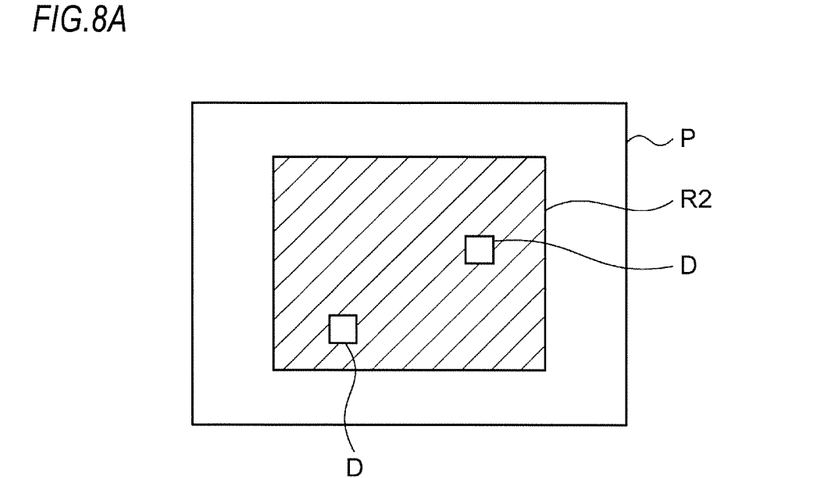
FIG. 8A pictorially depicts an imaging range when malfunction occurs at a part of a mirror array element in a state where the light deflection device is set to a second reflection position P2, and FIG. 8B pictorially depicts an imaging range when malfunction occurs at a part of the mirror array element in a state where the light deflection device is set to a first reflection position P1.
Figure 8B:
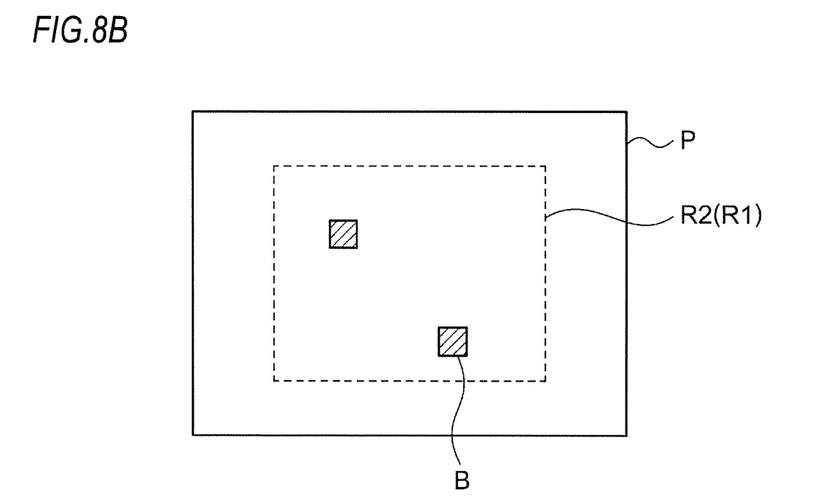

FIG. 8A pictorially depicts an imaging range when malfunction occurs at a part of the mirror array element in a state where the light deflection device 100 is set to the second reflection position P2, and FIG. 8B pictorially depicts an imaging range when malfunction occurs at a part of the mirror array element in a state where the light deflection device 100 is set to the first reflection position P1.

The control unit 50 of the lamp unit 10 is configured to control operations of the irradiation optical system 16 and the light deflection device 100 so as to perform a detection operation for checking whether there is malfunction in the light deflection device 100 at predetermined timing. Specifically, the control unit 50 is configured to turn on the entire light source 20 of the irradiation optical system 16 to thereby irradiate the reflection part 100a of the light deflection device 100 with the light and to control the light deflection device 100 so that all the mirror elements 102 are located at the second reflection position P2, at timing (for example, during the stop or during the non-use of the lamp unit) at which the irradiation of the lamp unit 10 is not interfered with. In this state, the imaging unit 17 is configured to detect the reflected light R2 from the reflection part 100a of the light deflection device 100.

Thereby, the incident light Lin irradiated from the irradiation optical system 16 is detected as the reflected light R2 having no chipped image (dark part) by the imaging unit 17 when all the mirror elements 102 of the light deflection device 100 are normally switched to the second reflection position P2. In this case, it is estimated that there is no malfunction in the light deflection device 100.

On the other hand, when some of the mirror elements 102 are kept at the first reflection position P1 due to the malfunction, a chipped image (a non-irradiation part (dark part)) D is detected in a part of the reflected light R2 of the captured image P, as shown in FIG. 8A. In this case, it is estimated that there is malfunction in the light deflection device 100, and the light distribution control (for example, lighting and lights-out of the light source) can be thereafter performed on the assumption of the malfunction of some mirror elements 102.

The control unit 50 is configured to turn on the entire light source 20 of the irradiation optical system 16 to thereby irradiate the reflection part 100a of the light deflection device 100 with the light and to control the light deflection device 100 so that all the mirror elements 102 are located at the first reflection position P1, at timing at which the irradiation of the lamp unit 10 is not interfered with. In this state, the imaging unit 17 is configured to detect the reflected light R2 from the reflection part 100a of the light deflection device 100.

Thereby, the incident light Lin irradiated from the irradiation optical system 16 is not at all detected as the reflected light R2 by the imaging unit 17 when all the mirror elements 102 of the light deflection device 100 are normally switched to the first reflection position P1. In this case, it is estimated that there is no malfunction in the light deflection device 100.

On the other hand, when some of the mirror elements 102 are kept at the second reflection position P2 due to the malfunction, a bright spot (reflected light) B is detected in a part of a region, which corresponds to the reflected light R2, of the captured image P, as shown in FIG. 8B. In this case, it is estimated that there is malfunction in the light deflection device 100.

Second Embodiment

Figure 9:
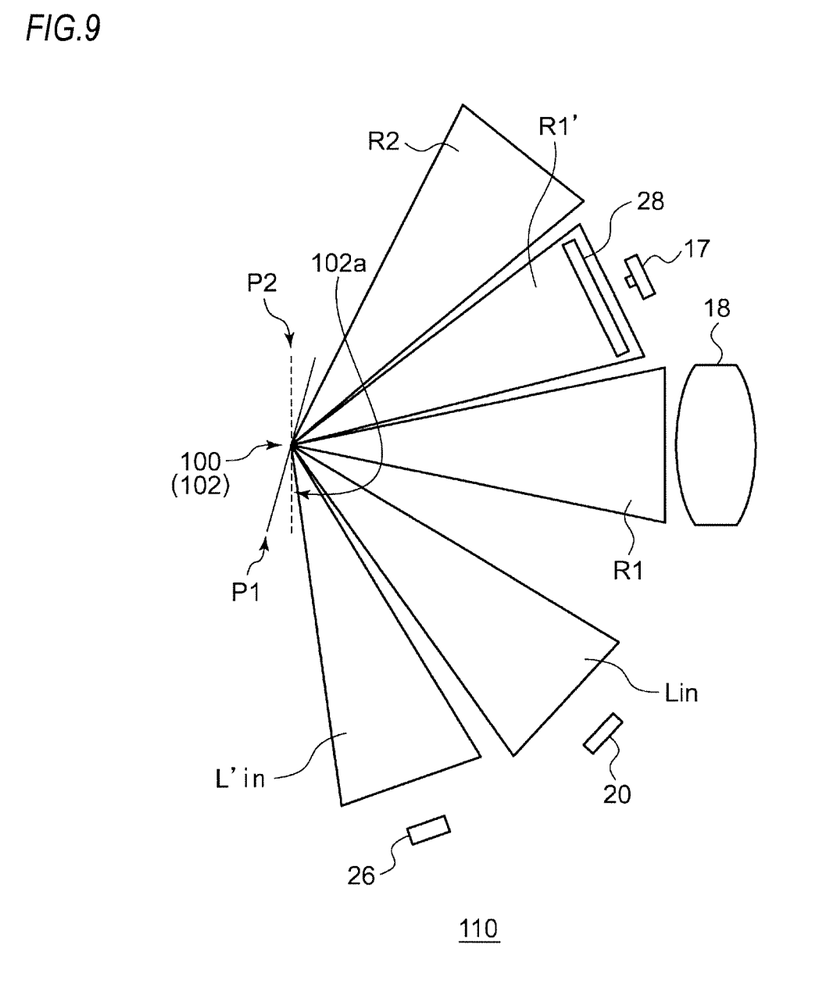
FIG. 9 is an enlarged view pictorially depicting the reflected light when visible light emitted from the light source and IR light emitted from an IR light source are reflected at the first reflection position and the second reflection position by the mirror element.

A lamp unit of a second embodiment is different from the lamp unit 10 of the first embodiment, in that it includes an inspection light irradiation unit configured to irradiate infrared (IR) light, which is non-visible light. In the below, the overlapping descriptions with the configurations and effects of the lamp unit 10 are appropriately omitted. FIG. 9 is an enlarged view pictorially depicting the reflected light when visible light emitted from the light source and IR light emitted from an IR light source are reflected at the first reflection position and the second reflection position by the mirror element.

As shown in FIG. 9, a lamp unit 110 of the second embodiment includes a projection lens 18 configuring a projection optical system, the light deflection device 100, the light source 20 configuring an irradiation optical system configured to irradiate light to the reflection part of the light deflection device 100, an inspection light irradiation unit 26 configured to irradiate IR light, and the imaging unit 17 configured to detect the IR light reflected at the light deflection device 100. The imaging unit 17 is arranged at a position at which the IR light (reflected light R1') reflected at the first reflection position P1 by the light deflection device 100 can be detected.

The light emitted from the light source 20 is condensed by a light condensing member (not shown), and the incident light Lin is incident on the reflective surface 102*a* of the mirror element 102. The mirror element 102 is arranged so that when the mirror element 102 reflects the incident light Lin at the first reflection position P1, the reflected light R1 is mainly directed toward the projection lens 18. Also, as shown in FIG. 3, the mirror element 102 is arranged so that when the mirror element 102 reflects the incident light Lin at the second reflection position P2, the reflected light R2 is not directed toward the projection lens 18.

In addition, in the lamp unit 110, the IR light emitted from the inspection light irradiation unit 26 is condensed by a light condensing member (not shown), and incident light L'in is incident on the reflective surface 102*a* of the mirror element 102. The mirror element 102 is arranged so that when the mirror element 102 reflects the incident light L'in at the first reflection position P1, the reflected light R1' is mainly directed toward the imaging unit 17. In the meantime, the lamp unit 110 includes an IR filter 28 arranged between the mirror element 102 and the imaging unit 17 and configured to cut the visible light and to transmit the IR light so that a part of the visible light of the light source 20 and visible light from an outside of the unit are not to be incident on the imaging unit 17.

The lamp unit 110 is preferably configured so that the incident light Lin from the light source 20, the incident light L'in from the inspection light irradiation unit 26 and the reflected lights R1, R2, R1' reflected by the reflection part 100*a* of the light deflection device 100 do not overlap each other.

A control unit of the lamp unit 110 configured as described above is configured to control operations of the light source 20, the inspection light irradiation unit 26 and the light deflection device 100 so as to perform a detection operation for checking whether there is malfunction in the light deflection device 100 at predetermined timing. Specifically, the control unit is configured to turn on the entire light source of the inspection light irradiation unit 26 to thereby irradiate the reflection part 100*a* of the light deflection device 100 with the IR light and to control the light deflection device 100 so that all the mirror elements 102 are located at the second reflection position P2, at timing (for example, during the stop or during the non-use of the lamp unit) at which the irradiation of the lamp unit 10 is not interfered with. In this state, the imaging unit 17 is configured to detect whether there is the reflected light R1' from the reflection part 100*a* of the light deflection device 100.

Thereby, the incident light L'in irradiated from the inspection light irradiation unit 26 is not at all detected as the reflected light R1' when all the mirror elements 102 of the light deflection device 100 are normally switched to the second reflection position P2. In this case, it is estimated that there is no malfunction in the light deflection device 100.

On the other hand, when some of the mirror elements 102 are kept at the first reflection position P1 due to the malfunction, a bright spot (reflected light) B is detected in a part of a region, which corresponds to the reflected light R1, of the captured image P, as shown in FIG. 8B. In this case, it is estimated that there is malfunction in the light deflection device 100, and the light distribution control (for example, lighting and lights-out of the light source) can be thereafter performed on the assumption of the malfunction of some mirror elements 102.

Like the first embodiment, the control unit may be configured to turn on the entire light source of the inspection light irradiation unit 26 to thereby irradiate the reflection part 100*a* of the light deflection device 100 with the IR light, and to control the light deflection device 100 so that all the mirror elements 102 are located at the first reflection position P1. At this time, as shown in FIG. 8A, when a chipped image (a non-irradiation part (dark part) D) is detected in a part of the reflected light R1' of the captured image P, it is thought that some of the mirror elements 102 are kept at the second reflection position P2, and it is estimated that there is malfunction in the light deflection device 100.

In this way, the lamp unit 110 of the second embodiment can detect the malfunction of the light deflection device 100, based on the IR light to be irradiated from the inspection light irradiation unit 26, the reflection position (the first reflection position or the second reflection position) of the light deflection device 100, and the detection state of the reflected light in the imaging unit 17. Also, since the IR light is used as the inspection light, it is possible to check whether there is the malfunction in the light deflection device 100, at any timing at which the light is not irradiated from the irradiation optical system.

The lamp unit 110 of the second embodiment uses the IR light, rather than the visible light from the irradiation optical system, when checking whether there is the malfunction in the light deflection device 100. Accordingly, it is possible to prevent the visible light from the irradiation optical system from being leaked to an outside of the lamp unit 110. Also, since the IR light is used as the inspection light, the outside light of the lamp is difficult to influence the lamp unit.

Although the present disclosure has been described with reference to the embodiments, the present disclosure is not limited to the embodiments, and appropriate combinations and replacements of the configurations of the respective embodiments are also included in the present disclosure. Also, it is possible to appropriately interchange the combinations and processing sequences of the respective embodiments and to implement modifications such as diverse design changes with respect to the respective embodiments, based on the knowledge of one skilled in the art, and the modified embodiments are also included in the scope of the present disclosure.

The invention claimed is:

1. A lamp unit comprising:
   a projection optical system;
   a light deflection device which is arranged at a rear of the projection optical system and which is configured to selectively reflect incident light toward the projection optical system;
   an irradiation optical system configured to irradiate light to a reflection part of the light deflection device; and
   a detector configured to detect light reflected by the light deflection device,
   wherein the light deflection device is configured to switch a first reflection position and a second reflection position in at least some region of the reflection part, the first reflection position is a position at which the light irradiated by the irradiation optical system is to be reflected toward the projection optical system so as to be effectively used as a part of a desired light distribution pattern, and the second reflection position is a position at which the light irradiated by the irradiation optical system is to be reflected so as not to be effectively used, and wherein the detector is arranged at a position at which the light reflected at the second reflection position by the light deflection device can be detected.

2. The lamp unit according to claim 1, wherein the detector is arranged at a position at which the detector does not interfere with light reflected at the first reflection position by the light deflection device.

3. The lamp unit according to claim 1, wherein the detector detects reflected light when light is irradiated from the irradiation optical system to the reflection part of the light deflection device located at the second reflection position.

4. The lamp unit according to claim 1, wherein the light deflection device includes a micro mirror array, and wherein each mirror element of the micro mirror array is configured to switch the first reflection position and the second reflection position about a rotation axis.

5. A lamp unit comprising:

a projection optical system;

a light deflection device which is arranged at a rear of the projection optical system and which is configured to selectively reflect incident light toward the projection optical system;

an irradiation optical system configured to irradiate light to a reflection part of the light deflection device;

an inspection light irradiation unit configured to irradiate non-visible light, and a detector configured to detect non-visible light reflected by the light deflection device, wherein the light deflection device is configured to switch a first reflection position and a second reflection position in at least some region of the reflection part, the first reflection position is a position at which the light irradiated by the irradiation optical system is to be reflected toward the projection optical system so as to be effectively, used as a part of a desired light distribution pattern, and the second reflection position is a position at which the light irradiated by the irradiation optical system is to be reflected so as not to be effectively used, and wherein the detector is arranged at a position at which the non-visible light reflected at the first reflection position by the light deflection device can be detected.

* * * * *